(12) United States Patent
Meyer

(10) Patent No.: US 11,242,870 B2
(45) Date of Patent: Feb. 8, 2022

(54) CYLINDER BYPASS

(71) Applicant: Norwood Sales, Inc., Horace, ND (US)

(72) Inventor: Matt Meyer, Fargo, ND (US)

(73) Assignee: Norwood Sales, Inc., Horace, ND (US)

( * ) Notice: Subject to any disclaimer, the term of this patent is extended or adjusted under 35 U.S.C. 154(b) by 0 days.

(21) Appl. No.: 16/884,810

(22) Filed: May 27, 2020

(65) Prior Publication Data

US 2021/0372438 A1 Dec. 2, 2021

(51) Int. Cl.
| | |
|---|---|
| *F15B 15/14* | (2006.01) |
| *F15B 11/16* | (2006.01) |
| *F15B 13/02* | (2006.01) |
| *F15B 15/20* | (2006.01) |
| *F15B 11/10* | (2006.01) |
| *A01B 73/04* | (2006.01) |
| *A01B 73/06* | (2006.01) |

(52) U.S. Cl.
CPC .......... *F15B 13/021* (2013.01); *A01B 73/048* (2013.01); *A01B 73/065* (2013.01); *F15B 11/10* (2013.01); *F15B 11/16* (2013.01); *F15B 13/024* (2013.01); *F15B 13/027* (2013.01); *F15B 15/149* (2013.01); *F15B 15/20* (2013.01); *F15B 2211/30505* (2013.01); *F15B 2211/30525* (2013.01); *F15B 2211/55* (2013.01); *F15B 2211/7053* (2013.01); *F15B 2211/71* (2013.01)

(58) Field of Classification Search
CPC .......... F15B 2211/76; F15B 2211/7653; F15B 11/048; F15B 11/10; F15B 15/20; F15B 13/021; F15B 2211/8603; F15B 2211/8616; F15B 2211/30505; F15B 2211/30525
See application file for complete search history.

(56) References Cited

U.S. PATENT DOCUMENTS

| | | | | |
|---|---|---|---|---|
| 4,942,934 A | * | 7/1990 | Moriarty | F16H 61/452 180/6.48 |
| 2010/0326383 A1 | * | 12/2010 | Auchter | F01L 1/34 123/90.15 |

FOREIGN PATENT DOCUMENTS

| | | |
|---|---|---|
| DE | 2046947 | 3/1972 |
| EP | 0701771 | 3/1996 |
| EP | 3788862 | 3/2021 |

(Continued)

OTHER PUBLICATIONS

"International Application Serial No. PCT US2021 070601, International Search Report dated Sep. 9, 2021", 5 pgs.

(Continued)

*Primary Examiner* — Abiy Teka
*Assistant Examiner* — Daniel S Collins
(74) *Attorney, Agent, or Firm* — Schwegman Lundberg & Woessner, P.A.

(57) ABSTRACT

Disclosure herein are hydraulic systems and method of use thereof. The hydraulic systems can include a hydraulic cylinder and a manifold. The hydraulic cylinder can have a first end and a second end. The hydraulic cylinder can include a first port, a second port, and a third port. The first port can be located proximate the first end. The second port cane be located proximate the second end. The third port can be located in between the first port and the second port. The manifold can include a first valve and a second valve. The first valve can be in fluid communication with the first port and the third port. The second valve can be in fluid communication with the second port and the third port.

26 Claims, 7 Drawing Sheets

(56) References Cited

FOREIGN PATENT DOCUMENTS

| | | |
|---|---|---|
| FR | 2118094 | 7/1972 |
| WO | 2013174121 | 11/2013 |
| WO | 2017172690 | 10/2017 |

OTHER PUBLICATIONS

"International Application Serial No. PCT US2021 070601, Written Opinion dated Sep. 9, 2021", 8 pgs.

* cited by examiner

CYLINDER BYPASS

FIELD OF THE DISCLOSURE

The present subject matter relates to hydraulics and, more particularly, to hydraulic cylinders. More specifically, the present disclosure relates to hydraulic cylinders having one or more bypass valves.

BACKGROUND

In recent years, the average acreage of individual farms has continually increased. To efficiently process the greater acreage, modern farming implements have correspondingly increased in size to maximize the number rows that can be tilled, planted, treated, harvested, cultivated, or otherwise processed with each pass of the farm implement. The farming implements need to be transported efficiently between various fields. As a result, roads are frequently used to transport farm implements between fields.

BRIEF DESCRIPTION OF THE FIGURES

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Agricultural operations utilize large implements in order to cover large fields with greater efficiency. For example, large plows, planters, etc. can span 10 to 20 feet to well over 75 to 100 feet. The large span can allow the implement to till, plow, plant, treat, harvest, cultivate, or otherwise process large sections (e.g., multiple rows) of a field with a single pass of the tractor and implement. To transport large implements between fields, the implements may fold at one or more locations and/or otherwise be reconfigured. By folding the implements, the overall span of the large implements can be reduced to allow the implements to be transported on roads without hitting signs, utility poles, etc.

Movement between the various states, or configurations, can be accomplished using hydraulic systems. While in one or more states, or configurations, the implements can be damaged should the hydraulic systems be over pressurized or a spike in hydraulic pressure occur.

As disclosed herein, one or more hydraulic cylinders with three or more ports can be utilized with one or more one-way valves, such as check valves or other valves that allow flow in only one direction, to create a bypass. The bypass can allow fluid to be diverted within the cylinder. The diversion of the fluid allows the fluid to circulate within the system and/or return to a reservoir or other storage area, thereby reducing the chances for damage to the implement and/or hydraulic system.

The above discussion is intended to provide an overview of subject matter of the present patent application. It is not intended to provide an exclusive or exhaustive explanation of the invention. The description below is included to provide further information about the present patent application.

Figure 1A:
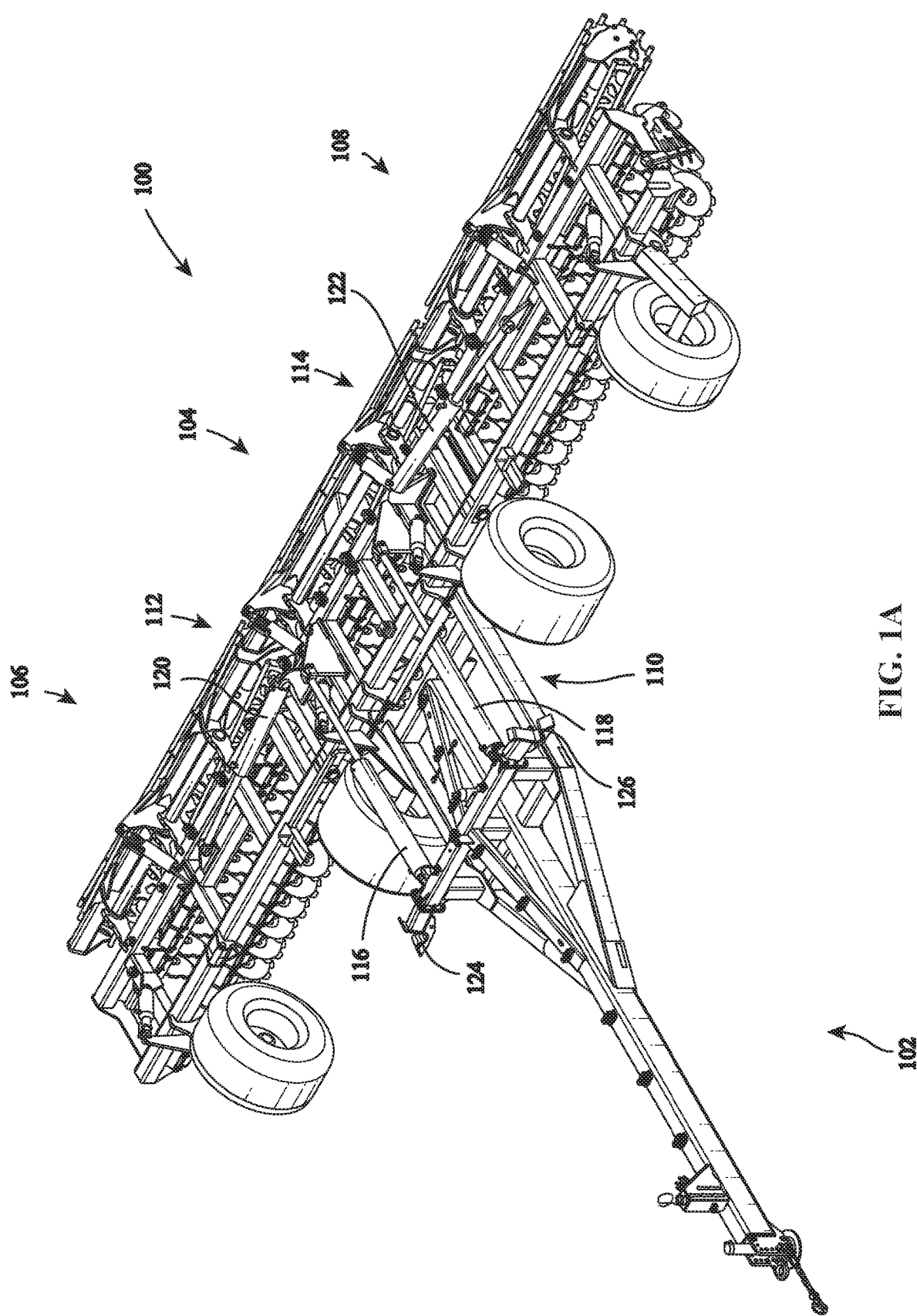
FIG. 1A illustrates an implement in a first state, in accordance with at least one example of this disclosure.
Figure 1B:
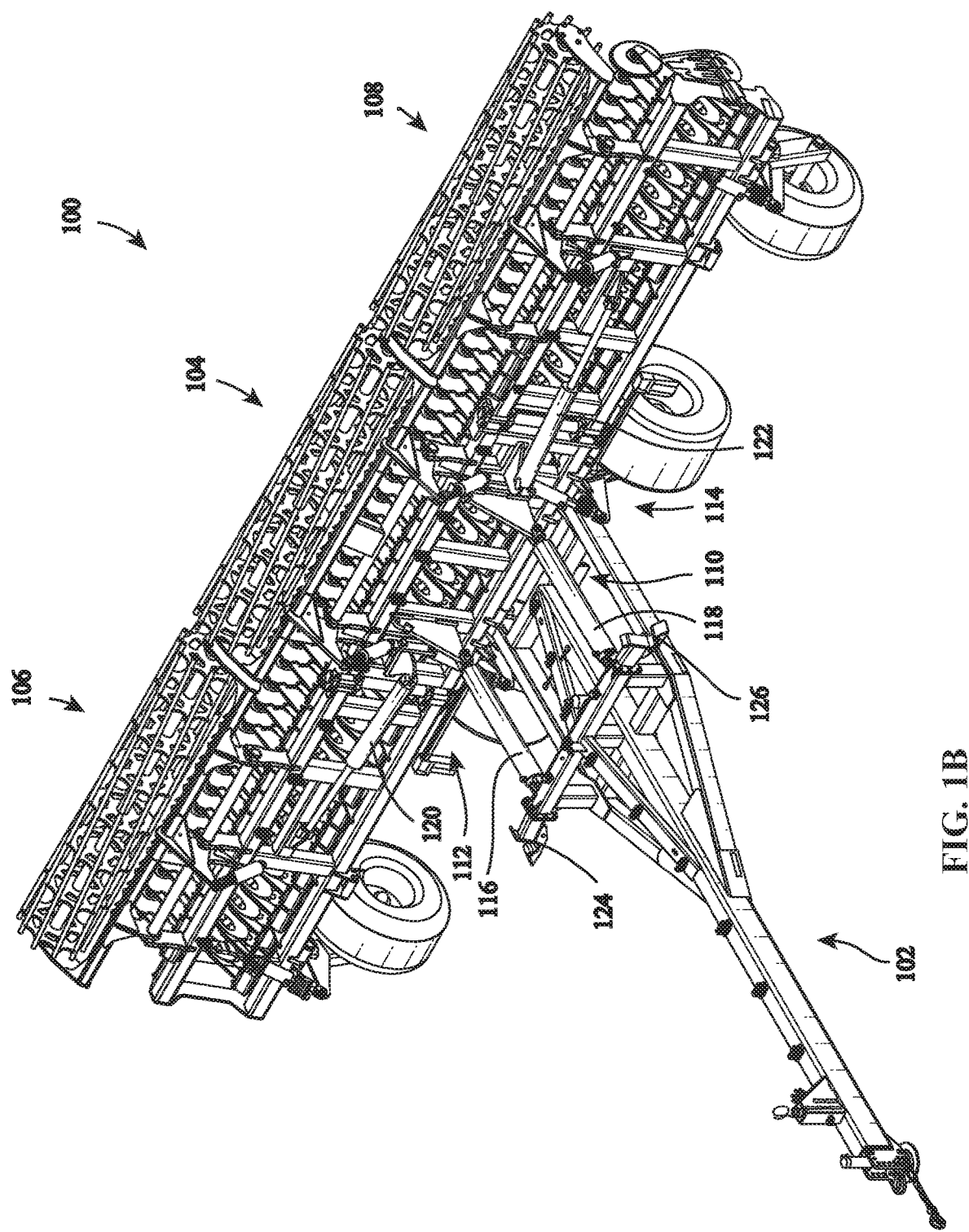
FIG. 1B illustrates the implement in a second state, in accordance with at least one example of this disclosure.
Figure 1C:
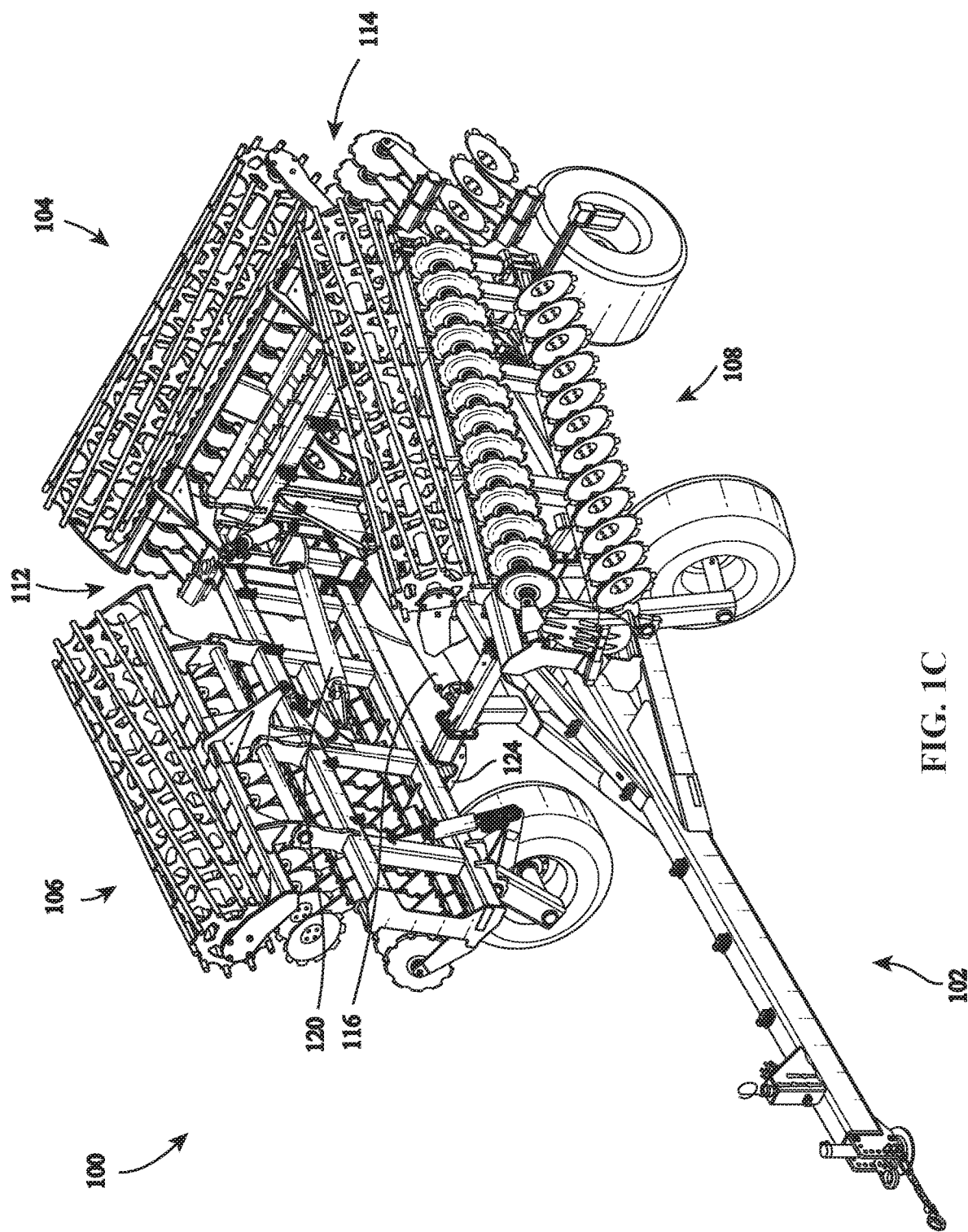
FIG. 1C illustrates the implement in a third state, in accordance with at least one example of this disclosure.

FIG. 1A illustrates an implement 100 in a first state, in accordance with at least one example of this disclosure. FIG. 1B illustrates implement 100 in a second state, in accordance with at least one example of this disclosure. FIG. 1C illustrates implement 100 in a third state, in accordance with at least one example of this disclosure.

Implement 100 can include a hitch portion 102, a center section 104, a first wing 106, and a second wing 108. Center section 104 can be pivotably attached to hitch portion 102 via a pivot section 110. First wing 106 can be pivotably attached to center section 104 via a second pivot section 112. Second wing 108 can be pivotably attached to center section 104 via a third pivot section 114.

Movement of center section 104 can be accomplished by a first cylinder 116 and a second cylinder 118. While FIGS. 1A, 1B, and 1C shows two cylinders, movement of center section 104 can be accomplished with one or more cylinders. Movement of first wing 106 can be accomplished with a first wing cylinder 120. Movement of second wing 108 can be accomplished by a second wing cylinder 122. While FIGS. 1A, 1B, and 1C show single cylinders used to move each of first wing 106 and second wing 108, any number of cylinders can be used without departing from the scope of this disclosure.

FIG. 1A illustrates implement 100 in a second state, such as a deployed or unfolded state. The deployed state can include one or both of first wing 106 and second wing 108 positioned relatively parallel to the ground. For example, in the deployed state, implement 100 can be connected to a tractor using hitch portion 102. The tractor can tow implement 100 such that tooling (e.g., plows, tillers, planters, etc.) connected to center portion 104, first wing 106, and second wing 108 contact the ground.

To transport implement 100 when not in use, center portion 104, first wing 106, and second wing 108 can be moved into a fully retracted or fully folded state. FIG. 1B illustrates implement 100 in a second state, such as a partially retracted or partially folded state. As shown in FIG. 1B, center portion 104 can be pivoted about first pivot section 110. The partially retracted state shown in FIG. 1B can allow implement 100 to be repositioned within a field without the tooling connected to center portion 104, first wing 106, and second wing 108 contacting the ground. The partially retracted state shown in FIG. 1B can also be an intermediate stage in fully retracting center portion 104, first wing 106, and second wing 108. As used herein, partially folded or partially retracted can be any intermediate position between a fully unfolded or fully deployed state and a fully folded or fully retracted state.

FIG. 1C illustrates implement 100 in a third state, such as fully retracted or folded state. As shown in FIGS. 1A and 1B, a first rest 124 and a second rest 126 can be attached to hitch portion 102. As shown in FIG. 1C, when in the fully retracted state, first wing 106 can rest in first rest 124 and second wing 108 can rest in second rest 126. By resting first wing 106 in first rest 124 and second wing 108 in second rest 126, pressure within the hydraulic system that controls movement of center portion 104, first wing 106, and second wing 108 can be lower. Stated another way, first rest 124 and second rest 126 can support first wing 106 and second wing 108 instead of hydraulic pressure. Rope, chains, or other straps can be used to secure first wing 106 to first rest 124 and second wing 108 to second rest 126. Still further, not ropes, chains, or other straps need to be used and gravity can keep first wing 106 resting on first rest 124 and second wing 108 resting on second rest 126.

Figure 2A:
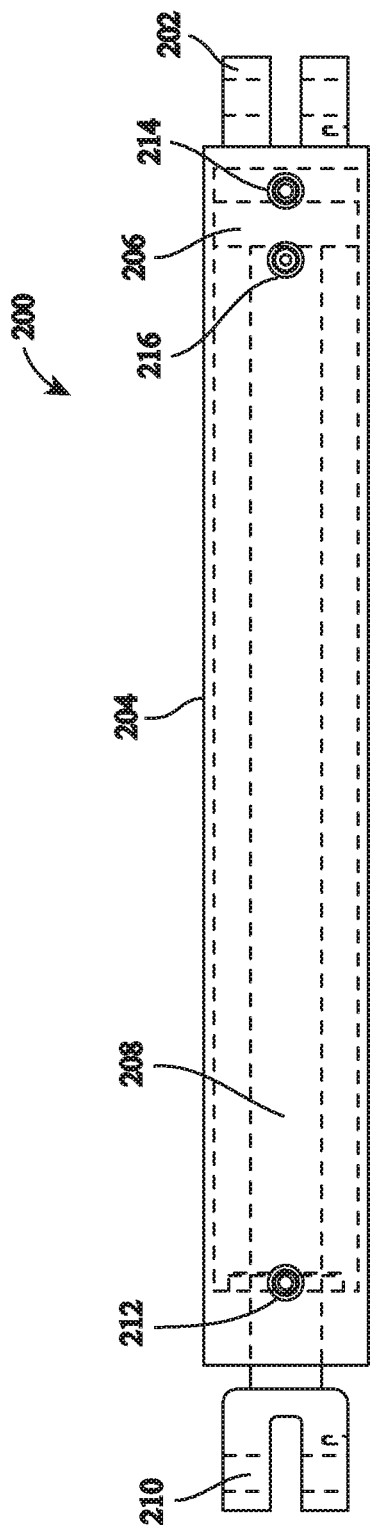
FIGS. 2A and 2B illustrate a cylinder in accordance with at least one example of this disclosure.
Figure 2B:
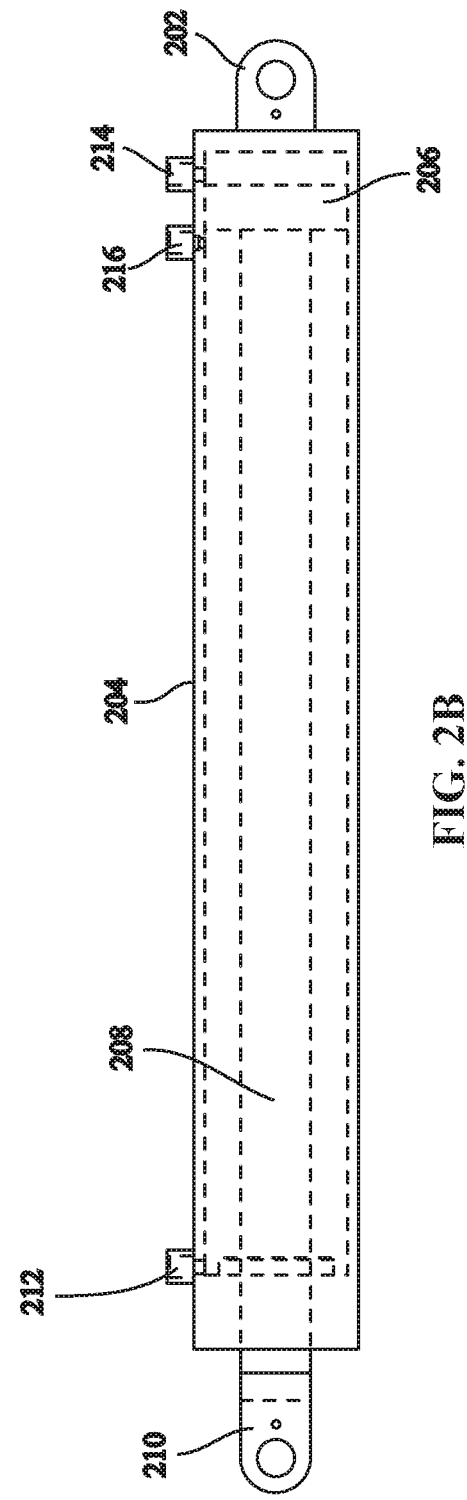

FIGS. 2A and 2B illustrate a cylinder 200 in accordance with at least one example of this disclosure. Any or all of first cylinder 116, second cylinder 118, first wing cylinder 120, or second wing cylinder 122 can be cylinder 200.

Cylinder 200 can include a base mount 202, a tube 204, a piston 206, a rod 208, and a rod mount 210. Cylinder 200 can include a first port 212 located at a first end of tube 204, a second port 214 located at a second end of tube 204, and a third port 216 located in between first port 212 and second port 214.

As disclosed herein, fluid can flow into and out of first port 212, second port 214, and third port 214. The direction of the flow can be controlled with valves, such as check valves, as disclosed herein. For example, during a retraction stroke, fluid can enter first port 212 and cause movement of piston 206 toward the second end of tube 204 and second port 214. Upon piston 206 passing third port 216, the fluid can exit tube 204 via third port.

While FIGS. 2A and 2B show third port 216 located proximate second port 214, third port 216 can be located proximate first port 212 or at any location in between first port 212 and second port 214. For example, third port 216 can be located an equal distance from both first port 212 and second port 214.

Figure 3A:
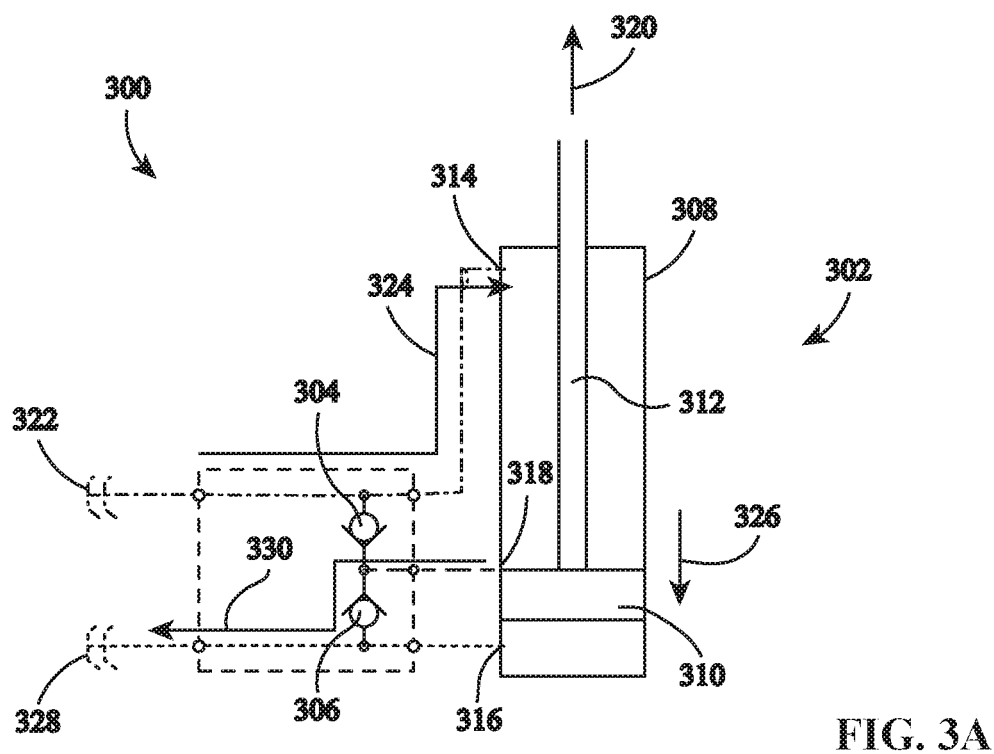
FIG. 3A illustrates a schematic of a hydraulic system in a first state, in accordance with at least one example of this disclosure.

FIG. 3A illustrates a schematic of a hydraulic system 300 in a first state, in accordance with at least one example of this disclosure. Hydraulic system 300 can include a cylinder 302, a first valve 304, and a second valve 306. Cylinder 302 can include a tube 308, a piston 310, a rod 312, a first port 314, a second port 316, and a third port 318. Cylinder 200 is an example of cylinder 302.

The first state shown in FIG. 3A is an example of a state in which center section 104, first wing 106, and second wing 108 are in a raised position as shown in FIG. 1B. In the raised position, first wing 106 and second wing 108 can be folded for storage on first rest 124 and second rest 126 as shown in FIG. 1C.

As shown in FIG. 3A, center section 104, first wing 106, and second wing 108 can apply an external load as indicated by arrow 320. In other words, the position of center section 104, first wing 106, and second wing 108 can create tension within rod 312. To raise center section 104, first wing 106, and second wing 108, fluid can flow from an implement raise 322 and flow into cylinder 302 via first port 314 as indicate by arrow 324. As the fluid flows from implement raise 322, which can be a reservoir or a prime mover controlled via a tractor selective control valve (SCV). As the fluid flows from implement raise 322, first valve 304 can prevent the fluid from flowing into both of second port 316 and third port 318. As used herein, implement raise and implement lower can refer to hydraulic lines, hoses, ports, reservoirs, or other components of a tractor that allow fluid to flow to or from the tractor without regard for a direction of travel of the implement.

As the fluid flows into cylinder 302, piston 310 moves as indicated by arrow 326. Once piston 310 passes third port 318, the fluid can then flow from cylinder 302 via third port. After leaving cylinder 302, the fluid can flow through second valve 306 and back to a implement lower 328. Implement lower 328 can be a reservoir or the prime mover controlled via the tractor SCV as disclosed herein.

The weight of center section 104, first wing 106, and second wing 108 applies tension on rod 312 that wants to extend cylinder 302. Stated another way, the center of gravity of center section 104, first wing 106, and second wing 108 are located aft of first pivot section 110 while first wing 106 and second wing 108 are in an unfolded state. The pressure within the fluid can cause piston 310 to move as indicated by arrow 326 until piston 310 passes third port 318. Once past third port 318, center section 104 can be in a position to allow folding of first wing 106 and second wing 108 such that they can rest in first rest 124 and second rest 126, respectively.

Figure 3B:
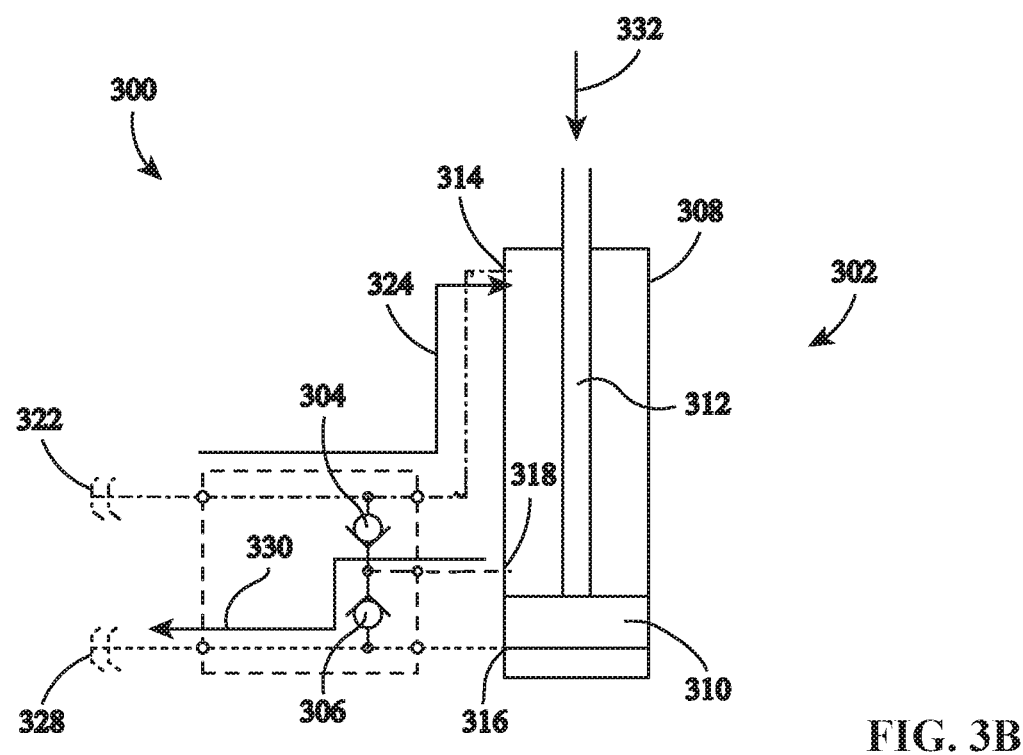
FIG. 3B illustrates a schematic of the hydraulic system in a second state, in accordance with at least one example of this disclosure.

FIG. 3B illustrates a schematic of hydraulic system 300 in a second state, in accordance with at least one example of this disclosure. The second state shown in FIG. 3B is an example of a state in which center section 104, first wing 106, and second wing 108 are being lowered in a folded position as shown in FIG. 1C to rest on first rest 124 and second rest 126. In the folded position, first wing 106 and second wing 108 can be stored and rest on first rest 124 and second rest 126. In the second state it is desirable to avoid applying additional hydraulic pressure or otherwise over pressuring cylinder 302 (i.e., first cylinder 116 and second cylinder 118) because the additional pressure could result in damage to first rest 124, second rest 126, first wing 106, and/or second wing 108.

As shown in FIG. 3B, center section 104, first wing 106, and second wing 108 can apply an external load as indicated by arrow 332. The change in direction of the external load can occur as first wing 106 and second wing 108 are folded. In other words, during the folding of first wing 106 and second wing 108 from the unfolded position shown in FIG. 1B to the folded position shown in FIG. 1C, the center of gravity of center section 104, first wing 106, and second wing 108 can shift from being aft of first pivot section 110 to forward of first pivot section 110.

As the center of gravity of center section 104, first wing 106, and second wing 108 shifts, piston 310 can translate to a position slight adjacent to second port 316, yet not blocking second port 316. Implement lower 328 can be used to control movement of piston 310 once the center of gravity of center section 104, first wing 106, and second wing 108 travels forward of first pivot section 110 so as to prevent first wing 106 and second wing 108 from crashing into first rest 124 and second rest 126.

First cylinder 116 and second cylinder 118 can secure first wing 106 and second wing 108 in first rests 124 and second rest 126. For example, fluid can flow from implement raise 322 and into first port 314. An over pressurization can be avoided by the fluid exiting cylinder 302 via third port and returning to implement lower 328 as indicate by arrow 330.

In addition, pins or other items can be used to secure first wing 106 and second wing 108 to first rest 124 and second rest 126.

Figure 3C:
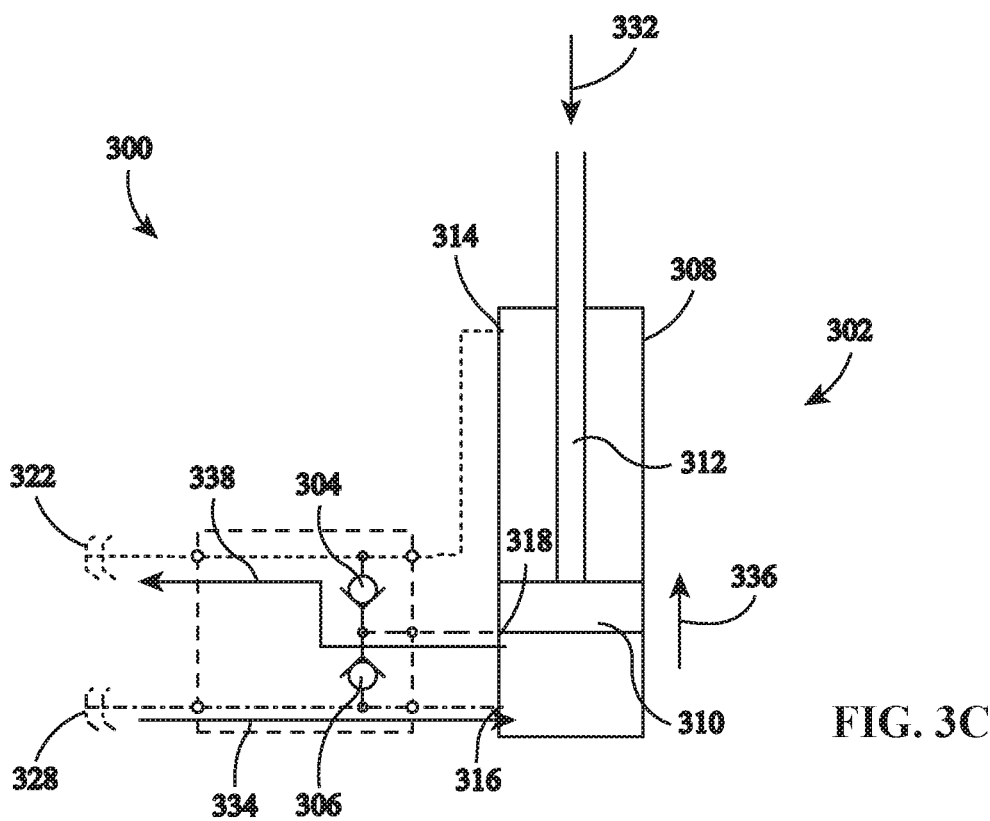
FIG. 3C illustrates a schematic of the hydraulic system in a third state, in accordance with at least one example of this disclosure.

FIG. 3C illustrates a schematic of hydraulic system 300 in a third state, in accordance with at least one example of this disclosure. The third state shown in FIG. 3C is an example of a state in which center section 104, first wing 106, and second wing 108 are in a folded position as shown in FIG. 1C, but first wing 106 and second wing 108 are raised above first rest 124 and second rest 124. In other words, first wing 106 and second wing 108 are raised to a position so that they can be unfolded as shown in FIG. 1B. In the third state it is desirable to avoid moving center section 104, first wing 106, and second wing 108 too far so that the center of gravity of center section 104, first wing 106, and second wing 108 is aft of first pivot section 110 while first wing 106 and second wing 108 are in the folded position.

As shown in FIG. 3C, center section 104, first wing 106, and second wing 108 can apply an external load as indicated by arrow 332. This is the same external load from the second state when first wing 106 and second wing 108 are being lowered into first rest 124 and second rest 126.

To raise first wing 106 and second wing 108 from first rest 124 and second rest 126 fluid can flow from implement lower 328 and into cylinder 302 via second port 316 as indicated by arrow 334. The fluid flow can cause piston 310 to move as indicate by arrow 336. Upon raising first wing 106 and second wing 108 from first rest 124 and second rest 126 a distance that is set by the location of third port 318, the continued flow of fluid does not result in movement of piston 310 because the fluid exits cylinder 302 via third port 318 and returns to implement raise 322 as indicate by arrow 338. Until first wing 106 and second wing 108 are unfolded, continued fluid flow as shown by arrows 334 and 338 does not cause additional movement of center section 104, first wing 106, and second wing 108.

Figure 3D:
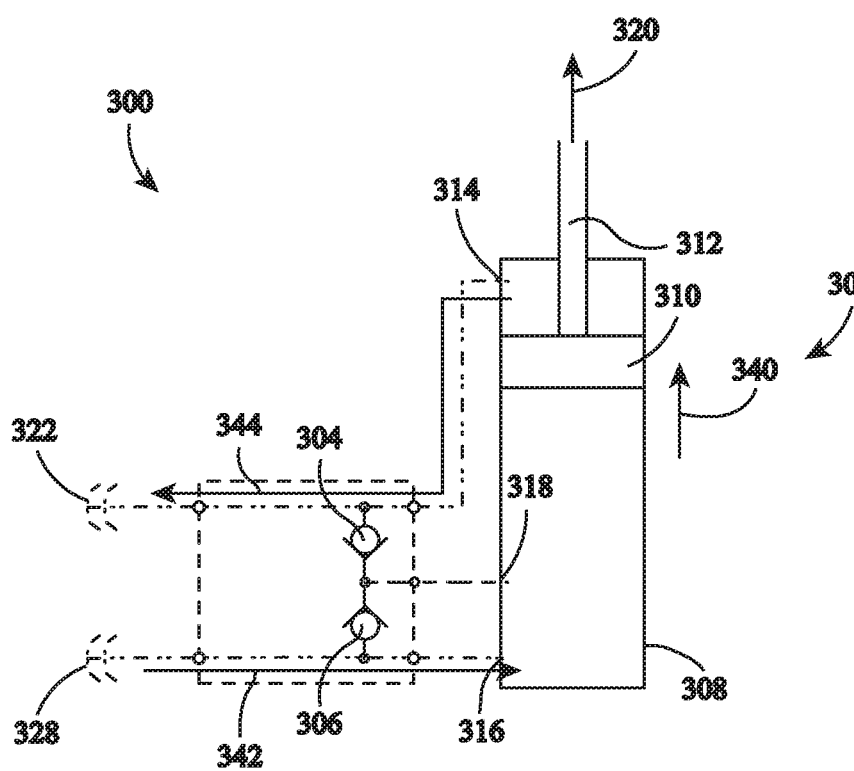
FIG. 3D illustrates a schematic of the hydraulic system in a fourth state, in accordance with at least one example of this disclosure.

FIG. 3D illustrates a schematic of hydraulic system 300 in a fourth state, in accordance with at least one example of this disclosure. The fourth state shown in FIG. 3D is an example of a state in which center section 104, first wing 106, and second wing 108 are transitioning from a folded position as shown in FIG. 1C, to an unfolded position as shown in FIG. 1B. In the fourth state first wing 106 and second wing 108 unfold and the center of gravity of center section 104, first wing 106, and second wing 108 travels aft of first pivot section 110.

As shown in FIG. 3D, once center section 104, first wing 106, and second wing 108 are unfolded to the point their center of gravity transitions aft of first pivot section 110, center section 104, first wing 106, and second wing 108 can apply an external load as indicated by arrow 332. This is the same external load from the first state when center section 104, first wing 106, and second wing 108 are being raise. The external load can cause piston 310 to move as indicate by arrow 340.

To unfold center section 104, first wing 106, and second wing 108 fluid can flow from cylinder 302 via first port 314. Gravity will cause center section 104, first wing 106, and second wing 108 to want to travel as toward the ground and create the external load as indicate by arrow 320. Implement raise 322 can control the fluid flow from cylinder 302 to prevent center section 104, first wing 106, and second wing 108 from crashing into the ground. Stated another way, implement raise 322 can provide a controlled descent of center section 104, first wing 106, and second wing 108.

As center section 104, first wing 106, and second wing 108 are being lowered, fluid can flow into cylinder 302 via second port 316 as indicated by arrow 342. Fluid flow into cylinder 302 can prevent air bubbles or lower pressures that could cause cavitation of the fluid within hydraulic system 300. The controlled descent of center section 104, first wing 106, and second wing 108 can be caused as fluid flows from cylinder 302 as indicate by arrow 344.

Figure 3E:
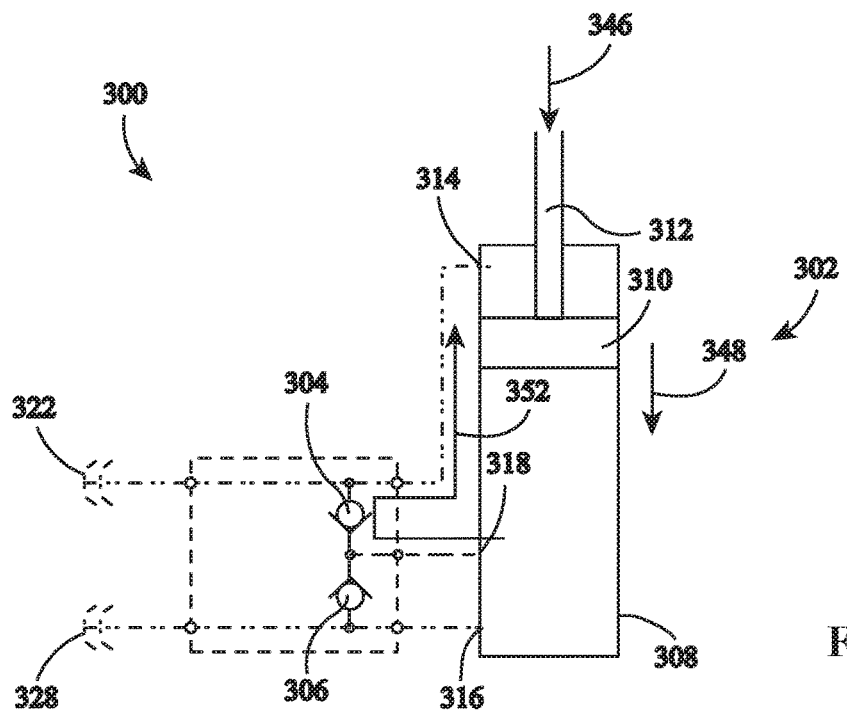
FIG. 3E illustrates a schematic of the hydraulic system in a fifth state, in accordance with at least one example of this disclosure.

FIG. 3E illustrates a schematic of hydraulic system 300 in a fifth state, in accordance with at least one example of this disclosure. The fifth state shown in FIG. 3E is an example of a state in which center section 104, first wing 106, and second wing 108 are positioned as shown in FIG. 1A and ready for plowing or otherwise cultivating the ground. In the fifth state a tractor's remote valve can be in a float position to allow center section 104, first wing 106, and second wing 108 to pivot freely about first pivot section 110 while plowing a field.

In the fifth state fluid is allowed to flow into cylinder 302 via first port 314 and second port 316 as indicated by arrow 352 as center section 104 moves as indicated by arrow 346 to compensate for uneven terrain. Once center section 104, first wing 106, and second wing 108 lowered into contact with the ground, hydraulic system 300 can be set to float so that fluid flows from implement raise 322 and implement lower 328 due to movement of center section 104.

The movement of piston 310 as indicate by arrow 348 allows center section 104, first wing 106, and second wing 108 to move freely within the confines of piston 310's ability to travel between first port 314 and third port 318. By allowing center section 104, first wing 106, and second wing 108 to flow, cylinder 302 is protected from column loading. In addition, cylinder 302 has an improved response with respect to conforming to irregularities in the field.

Figure 4:
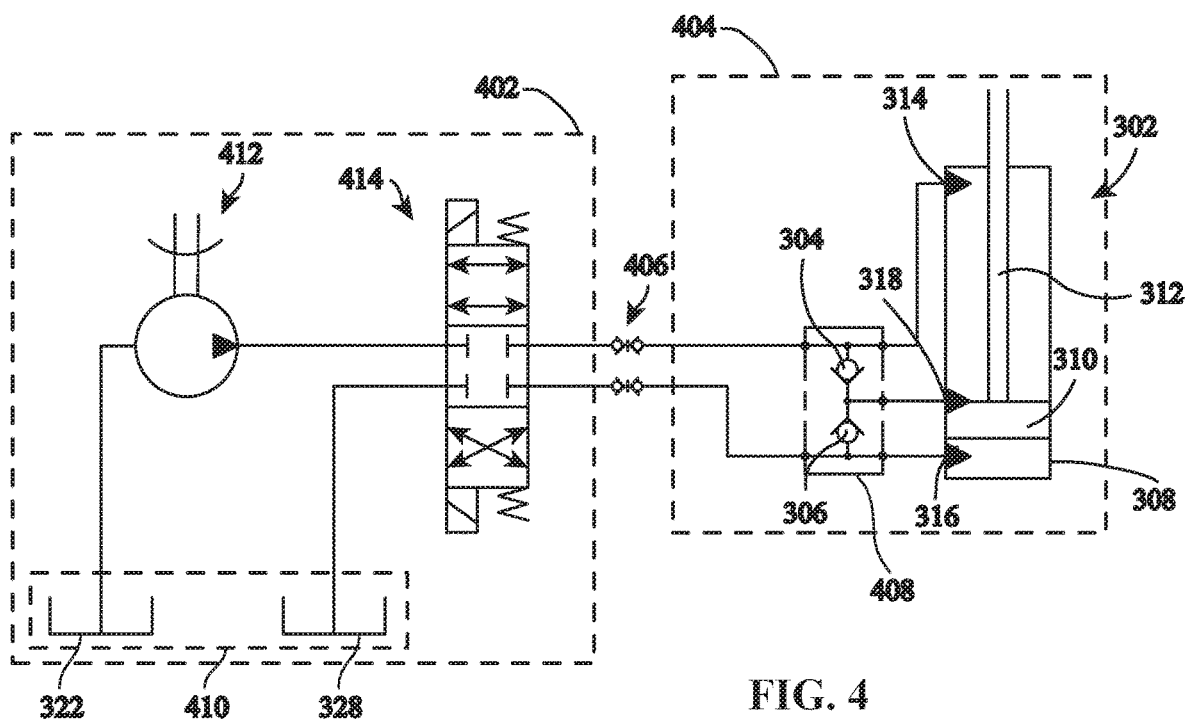
FIG. 4 illustrates a schematic of tractor and implement, in accordance with at least one example of this disclosure.

FIG. 4 illustrates a schematic of tractor 402 and an implement 404, in accordance with at least one example of this disclosure. Implement 404 can be any implement, such as implement 100, that can be connected to tractor 402. As shown in FIG. 4, implement 404 can be connected to tractor 402 via one or more quick couplers 406.

As shown in FIG. 4, implement 404 can include a cylinder 302 as disclosed herein. First valve 304 and second valve 306 can be components of a manifold 408. While FIG. 4 shows manifold 408 as a component of implement 404, manifold 408 can be a component of tractor 402 in examples disclosed herein.

Non-limiting examples of first valve 304 and second valve 306 can include check valves, solenoid valves, and pressure relief valves. As shown in FIG. 4, first valve 304 can be a check valve that that only allows fluid to flow from implement raise 322 into first port 314. First valve 304 can be a check valve that prevents fluid from flowing from implement raise 322 to second port 316 and third port 318. First valve 304 can fluidly connect first port 314 and third port 318 so that fluid can flow from third port 318 to first port 314 as disclosed above with respect to FIGS. 3A-3E. Second valve 305 can be a check valve that prevents fluid from flowing from implement lower 328 to first port 314 and third port 318. Second valve 306 can fluidly connect second port 316 and third port 318 so that fluid can flow from third port 318 to second port 316 as disclosed above with respect to FIGS. 3A-3E.

If first valve 304 and second valve 306 are solenoid valves, an onboard computer or other controller of tractor 402 can actuate the solenoid valves as needed so as to cause the solenoid valves to act a check valves and restrict fluid flow as disclosed herein. If first valve 304 and second valve 306 are pressure relief valves, then the pressure settings can be set to open when a desired fluid flow is desired and restrict fluid flow as disclosed herein.

Tractor 402 can include implement raise 322 and implement lower 328. Implement raise 322 and implement lower 328 can be separate reservoirs as shown in FIG. 4 or a single reservoir 410. A pump 412, sometimes called a prime mover, can pump fluid, such as hydraulic oil, to and from reservoir 410 to implement 404. The fluid flow can be controlled by a tractor SCV 414, sometimes called a directional control valve, as is known to one skilled in the art.

Additional Notes

The following, non-limiting examples, detail certain aspects of the present subject matter to solve the challenges and provide the benefits discussed herein, among others.

Example 1 is a hydraulic system comprising: a hydraulic cylinder having a first end, a second end, the hydraulic cylinder including: a first port located proximate the first end, a second port located proximate the second end, and a third port located in between the first port and the second port; and a manifold including: a first valve in fluid communication with the first port and the third port, and a second valve in fluid communication with the second port and the third port.

In Example 2, the subject matter of Example 1 optionally includes wherein the first valve is configured to allow fluid to flow from the third port to a directional control valve.

In Example 3, the subject matter of any one or more of Examples 1-2 optionally include wherein the second valve is configured to allow fluid to flow from the third port to a directional control valve.

In Example 4, the subject matter of any one or more of Examples 1-3 optionally include wherein the first valve and the second valve are in fluid communication with a prime mover.

In Example 5, the subject matter of any one or more of Examples 1-4 optionally include wherein the first valve and the second valve are check valves.

In Example 6, the subject matter of any one or more of Examples 1-5 optionally include wherein the first valve is a first relief valve set at a first relief pressure and the second valve is a second relief valve set a second relief pressure.

In Example 7, the subject matter of Example 6 optionally includes wherein the first relief pressure is equal to the second relief pressure.

In Example 8, the subject matter of any one or more of Examples 1-7 optionally include wherein the manifold is a component of a toolbar.

In Example 9, the subject matter of any one or more of Examples 1-8 optionally include wherein the manifold is a component of a tractor.

Example 10 is a hydraulic system comprising: a supply line; a return line; a hydraulic cylinder having a first end, a second end, and an intermediate portion located in between the first end and the second end, the hydraulic cylinder including: a first port located proximate the first end, a second port located proximate the second end, and a third port located in the intermediate portion in between the first port and the second port; and a manifold including: a first check valve in fluid communication with the supply line, the first port, and the third port, and a second check valve in fluid communication with the return line, the second port, and the third port.

In Example 11, the subject matter of Example 10 optionally includes wherein the first valve is configured to allow fluid to flow from the third port to a reservoir via the return line or the first port, and the second valve is configured to allow fluid to flow from the third port to the reservoir via the supply line or the second port.

In Example 12, the subject matter of any one or more of Examples 10-11 optionally include wherein the third port is located closer to the second port than the first port.

In Example 13, the subject matter of any one or more of Examples 10-12 optionally include wherein the manifold is a component of a tractor or a toolbar.

Example 14 is a toolbar comprising: a hitch portion; a center toolbar section pivotably attached to the hitch portion; a first wing pivotably attached to the center toolbar section; a second wing pivotably attached to the central toolbar portion; a first lift cylinder attached to the hitch portion and the center toolbar section, the first lift cylinder including: a first port located proximate a first end of the first lift cylinder, a second port located proximate a second end of the first lift cylinder, and a third port located in between the first port and the second port; and a manifold including: a first valve in fluid communication with the first port and the third port, and a second valve in fluid communication with the second port and the third port.

In Example 15, the subject matter of Example 14 optionally includes wherein the first valve is configured to allow fluid to flow from the third port to a directional control valve or the first port, and the second valve is configured to allow fluid to flow from the third port to the directional control valve or the second port.

In Example 16, the subject matter of any one or more of Examples 14-15 optionally include wherein the first valve is in fluid communication with a prime mover or a cylinder.

In Example 17, the subject matter of any one or more of Examples 14-16 optionally include wherein the first valve and the second valve are check valves.

In Example 18, the subject matter of any one or more of Examples 14-17 optionally include wherein first valve is a first relief valve set at a first relief pressure and the second valve is a second relief valve set at a second relief pressure.

In Example 19, the subject matter of Example 18 optionally includes wherein the first relief pressure is equal to the second relief pressure.

In Example 20, the subject matter of any one or more of Examples 14-19 optionally include a second lift cylinder attached to the hitch portion and the center toolbar section, the second lift cylinder including: a first port located proximate a first end of the second lift cylinder; a second port located proximate a second end of the second lift cylinder; and a third port located in between the first port of the second lift cylinder and the second port of the second lift cylinder, wherein the first valve is in fluid communication with the first port of the second lift cylinder and the third port of the second lift cylinder, and the second valve is in fluid communication with the second port of the second lift cylinder and the third port of the second lift cylinder.

In Example 21, the hydraulic systems, toolbars, apparatuses, and or methods of any one or any combination of Examples 1-20 can optionally be configured such that all elements or options recited are available to use or select from.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A hydraulic system comprising:
a hydraulic cylinder having a first end, a second end, the hydraulic cylinder including:
a first port located proximate the first end,
a second port located proximate the second end, and
a third port located in between the first port and the second port; and
a manifold including a first one-way valve in fluid communication with the first port and the third port so as to allow fluid to flow from the third port to the first port, wherein the first one-way valve is configured to allow fluid to flow from the third port to a directional control valve.

2. The hydraulic system of claim 1, further comprising a second one-way valve in fluid communication with the second port and the third port so as to allow fluid to flow from the third port to the second port.

3. The hydraulic system of claim 2, the second one-way valve configured to allow fluid to flow from the third port to a directional control valve.

4. The hydraulic system of claim 2, wherein the first one-way valve and the second one-way valve are in fluid communication with a prime mover.

5. The hydraulic system of claim 1, wherein the first one-way valve is a check valve.

6. The hydraulic system of claim 1, wherein the first one-way valve is a pressure relief valve.

7. The hydraulic system of claim 1, wherein the first one-way valve is a component of a toolbar or a tractor.

8. The hydraulic system of claim 1, wherein the manifold is a component of a toolbar or a tractor.

9. A hydraulic system comprising:
a supply line;
a return line;
a hydraulic cylinder having a first end, a second end, and an intermediate portion located in between the first end and the second end, the hydraulic cylinder including:
a first port located proximate the first end,
a second port located proximate the second end, and
a third port located in the intermediate portion in between the first port and the second port; and
a manifold including:
a first check valve in fluid communication with the supply line, the first port, and the third port, and
a second check valve in fluid communication with the return line, the second port, and the third port.

10. The hydraulic system of claim 9, wherein
the first valve is configured to allow fluid to flow from the third port to a reservoir via the return line or the first port, and
the second valve is configured to allow fluid to flow from the third port to the reservoir via the supply line or the second port.

11. The hydraulic system of claim 9, wherein the third port is located closer to the second port than the first port.

12. The hydraulic system of claim 9, wherein the manifold is a component of a tractor or a toolbar.

13. A toolbar comprising:
a hitch portion;
a center toolbar section pivotably attached to the hitch portion;
a first wing pivotably attached to the center toolbar section;
a second wing pivotably attached to the central toolbar portion;
a first lift cylinder attached to the hitch portion and the center toolbar section, the first lift cylinder including:
a first port located proximate a first end of the first lift cylinder,
a second port located proximate a second end of the first lift cylinder, and
a third port located in between the first port and the second port; and
a manifold including:
a first valve in fluid communication with the first port and the third port, and
a second valve in fluid communication with the second port and the third port.

14. The toolbar of claim 13, wherein
the first valve is configured to allow fluid to flow from the third port to a directional control valve or the first port, and the second valve is configured to allow fluid to flow from the third port to the directional control valve or the second port.

15. The toolbar of claim 13, wherein the first valve is in fluid communication with a prime mover or a cylinder.

16. The toolbar of claim 13, wherein the first valve and the second valve are check valves.

17. The toolbar of claim 13, wherein first valve is a first relief valve set at a first relief pressure and the second valve is a second relief valve set at a second relief pressure.

18. The toolbar of claim 17, wherein the first relief pressure is equal to the second relief pressure.

19. The toolbar of claim 13, further comprising a second lift cylinder attached to the hitch portion and the center toolbar section, the second lift cylinder including:
a first port located proximate a first end of the second lift cylinder;
a second port located proximate a second end of the second lift cylinder; and
a third port located in between the first port of the second lift cylinder and the second port of the second lift cylinder,
wherein
the first valve is in fluid communication with the first port of the second lift cylinder and the third port of the second lift cylinder, and
the second valve is in fluid communication with the second port of the second lift cylinder and the third port of the second lift cylinder.

20. A hydraulic system comprising:
a hydraulic cylinder having a first end, a second end, the hydraulic cylinder including:
a first port located proximate the first end,
a second port located proximate the second end, and
a third port located in between the first port and the second port;
a manifold including a first one-way valve in fluid communication with the first port and the third port so as to allow fluid to flow from the third port to the first port; and
a second one-way valve in fluid communication with the second port and the third port so as to allow fluid to flow from the third port to the second port.

21. The hydraulic system of claim 20, the second one-way valve configured to allow fluid to flow from the third port to a directional control valve.

22. The hydraulic system of claim 20, wherein the first one-way valve and the second one-way valve are in fluid communication with a prime mover.

23. The hydraulic system of claim 1, wherein the first one-way valve is a check valve.

24. The hydraulic system of claim 1, wherein the first one-way valve is a pressure relief valve.

25. The hydraulic system of claim 1, wherein the first one-way valve is a component of a toolbar or a tractor.

26. The hydraulic system of claim 1, wherein the manifold is a component of a toolbar or a tractor.

* * * * *

UNITED STATES PATENT AND TRADEMARK OFFICE
CERTIFICATE OF CORRECTION

| | | |
|---|---|---|
| PATENT NO. | : 11,242,870 B2 | Page 1 of 1 |
| APPLICATION NO. | : 16/884810 | |
| DATED | : February 8, 2022 | |
| INVENTOR(S) | : Matthew J. Meyer | |

It is certified that error appears in the above-identified patent and that said Letters Patent is hereby corrected as shown below:

On the Title Page

In item (72), in "Inventor", in Column 1, Line 1, delete "Matt" and insert --Matthew J.-- therefor Signed and Sealed this
Third Day of May, 2022

*Katherine Kelly Vidal*

Katherine Kelly Vidal
*Director of the United States Patent and Trademark Office*